Jan. 5, 1965  F. H. BASSETT  3,164,408
CAR SEAT CADDY
Filed July 25, 1963
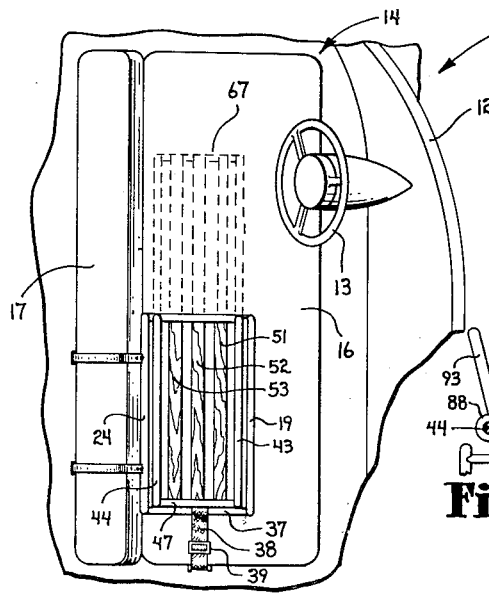
Fig. 1.
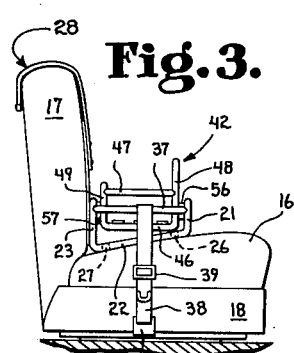
Fig. 3.
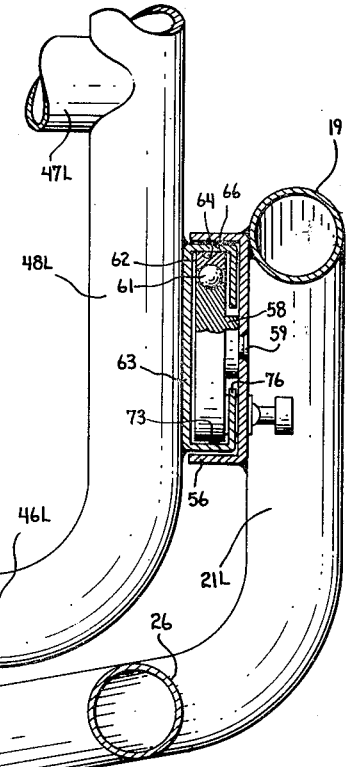
Fig. 4.
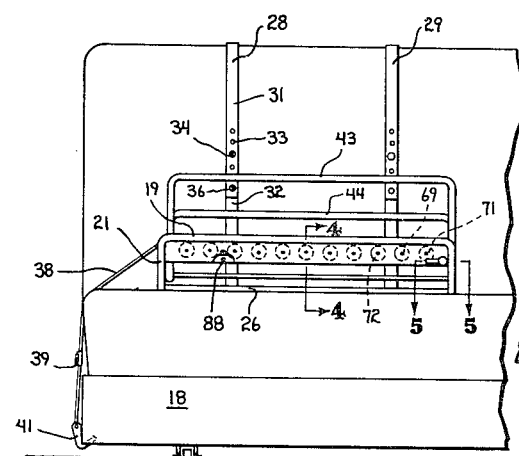
Fig. 2.
Fig. 6.
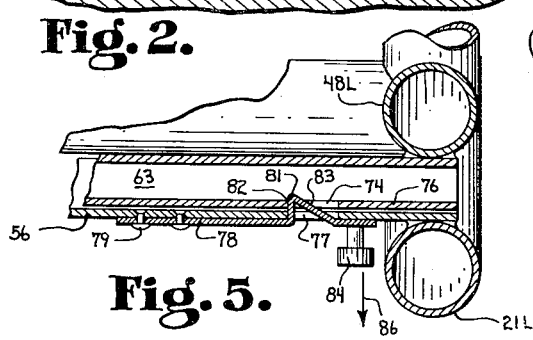
Fig. 5.
INVENTOR.
FREDERICK H. BASSETT
BY Lockwood, Woodard, Smith & Weikart
Attorneys

United States Patent Office 3,164,408
Patented Jan. 5, 1965

3,164,408
CAR SEAT CADDY
Frederick H. Bassett, R.R. #1, Carmel, Ind.
Filed July 25, 1963, Ser. No. 297,615
5 Claims. (Cl. 297—188)

This invention relates generally to passenger vehicles and more particularly to a load carrying device mountable on the seat of the vehicle and readily movable thereon to facilitate the loading and unloading of the device from one side of the vehicle.

In most standard automobiles and trucks, the front seat is wide enough to accommodate the driver and two passengers. In many uses of an automobile, the driver is the only person occupying the front seat and the remaining available space on the front seat is used for brief cases, sample boxes, and other items.

If the driver is a salesman or a contact man, he must make frequent stops in the course of a working day, to visit customers or clients. Upon getting out of the car, it is obviously necessary for the driver to use the door on the driver's side. It is usually the tendency for the driver to also remove any samples or briefcase which he needs or will need during the visit with the customer, and to remove these items from the driver's side. However, this usually means reaching well into the car while the door remains open and possibly in the line of traffic, and also requires dragging the cases or boxes or other materials across the seat in order to place them in a position where they can be lifted and removed. In addition to presenting a safety hazard because of the time required to perform this operation, there is considerable wear and tear on the upholstery of the front seat and also on the boxes and cases themselves.

It is therefore a general object of the present invention to provide a device facilitating the management of cases, boxes, and other loads on the seat of a vehicle.

A further object is to provide a device of simple, durable, reliable, and easily installed construction.

A further object is to provide a device of a type well suited to the transportation of infants.

Other objects, advantages, and features of the invention will become apparent as the description proceeds.

The full nature of the invention will be understood from the accompanying drawings and the following description and claims.

FIG. 1 is a top plan of a typical embodiment of the present invention installed in the front seat of an automobile.

FIG. 2 is a fragmentary front elevational view of the front seat having an installation according to the typical embodiment of the invention.

FIG. 3 is a side elevational view thereof.

FIG. 4 is an enlarged fragmentary section taken along the line 4—4 in FIG. 2 and viewed in the direction of the arrows.

FIG. 5 is an enlarged fragmentary section taken along the line 5—5 in FIG. 2 and viewed in the direction of the arrows.

Referring to the drawings in detail, the automobile 11 has a windshield 12, steering wheel 13 and front seat assembly 14. This seat assembly includes the seat 16 and seat back 17. The seat assembly also includes a seat base 18.

According to the present invention, a frame is provided which may be in a unique form as shown. The illustrated frame is of tubular construction of metal or plastic, for example. The illustrated frame includes an upper front cross-member 19, a right hand front upright 21, a right hand spacer bar 22, a right hand rear upright 23, and an upper rear cross-member 24. Corresponding portions are provided at the left hand end of the frame and all of these portions may be made of a single formed tube of metal with the ends welded or otherwise secured together. Such construction avoids any sharp edges. A lower front cross-member 26 extends between and is secured to the lower left hand and right hand side members and a lower rear cross-member 27 does likewise. These cross-members distribute the weight of the frame and the weight supported thereby over the width of the seat. They are normally welded or braced to the lower side members. It may be noted at this point that the upright members 21 and 23 meet the end or side members 22 at obtuse and acute angles, respectively, thereby conforming to the seat contour and assuring that the members 21 and 23 will be in a substantially upright condition when the frame is mounted to the typical car seat.

Seat hooks 28 and 29 are provided. These are identical, and each is adjustable to accommodate different heights of seat backs. For example, the hook 28 has an upper part 31 and lower part 32, the upper part being hooked and the lower part being secured to the rear cross-member 24 and also, if desired, to the lower rear cross-member 27. The overlapping portions of the upper and lower members 31 and 32, respectively, have a plurality of apertures 33 therein to receive screws for securing the upper and lower members together. That is providing a plurality of apertures, at least two screws 34 and 36 can be used for each hook and thereby insure that the hooks will be effective to prevent tipping of the frame in the event that the unit is heavily loaded and the car is suddenly braked to a stop.

An upper side member 37 is provided at the right hand end of the frame, being attached to the uprights 21 and 23. An elastic strap 38 is secured thereto having an adjustment buckle 39. This strap has a hook 41 at the lower end thereof which extends under the seat base and is hooked thereto.

A carriage 42 is also provided and is of a construction quite similar to the frame. The carriage includes a frame having an upper front horizontal member 43, an upper rear horizontal member 44, lower right hand end member 46, upper right hand end member 47, right hand front upright 48 and right hand rear upright 49. Identical portions are provided at the left hand end of the carriage and all of these portions may be made of a single formed tube of circular cross-section with the ends welded together. Corresponding members at the left hand end of the carriage are given the same reference numerals with a postscript L. The carriage is provided with a floor consisting of slats 51, 52, and 53 secured by suitable means such as rivets 54 to the lower left and right hand end members.

The means of supporting the carriage will now be described and they include a front channel 56 secured to the upper front cross-member and left and right front uprights. An identical channel 57 is secured to the rear upper frame cross-member 24 and to the left and right rear end uprights of the frame. Each of these channels has a series of bearings secured thereto. An example is shown in FIG. 4 where the bearing assembly includes an inner race 58 secured by the fastener 59 to the channel 56. The bearing balls 61 support the outer race 62. These bearing assemblies are spaced along the channels at the front and rear of the frame and provide in effect a series of support rollers.

A channel 63 is secured across the front of the carriage and is attached to the left and right hand front uprights. An identical channel is secured across the rear of the carriage, being attached to the left and right rear uprights. As shown in FIG. 4, the underside 64 of the upper flange of channel 63 rests on and is supported by the outer surface 66 of the bearing assembly. In this manner, the channel 63 is supported by the bearing assembly and is free to roll on the bearing assembly and in a plane perpendicular to the axis of the bearing assembly. Identical structure is provided across the rear of the carriage and the carriage is thereby supported for translation parallel to the seat and seat back.

It can be appreciated that when the carriage is moved to the position shown in the dotted outlines in FIG. 1 and represented by the reference numeral 67, there will be a tendency for the carriage to tip. To avoid tipping, the strap 38 functions quite effectively. By making this strap elastic with an adjustable feature, it is possible to apply whatever amount of tension is required to prevent tipping regardless of the size of the load normally supported in the carriage.

It will also be recognized that as the carriage is pulled toward the driver's side to position shown in FIG. 1 by the dotted outline 67, it is necessary that the frame prevent the carriage from tipping in the frame. This is also accomplished by the support rollers. For example, referring specifically to FIG. 2, the support roller or bearing assembly 69 and 71, for example, are supporting the load of the carriage when the carriage is in the extended position shown by the dotted outlines in FIG. 1. At the same time, the roller 72 will be engaging the upper surface of the lower flange of the carriage mounted channel thereby preventing tipping. Referring specifically to FIG. 4, when the bearing assembly illustrated therein is in the anti-tipping function, the outer circular surface 66 of the bearing will be engaging the upper surface 73 of the channel lower flange. Therefore, by having the upper and lower channel flanges of the carriage channels disposed in closely spaced vertical relation to the peripheral surface of the rollers, the rollers can serve either the load supporting or moment resisting functions whenever and as long as required.

Locking means are provided to lock the carriage in the normal retracted condition shown by the solid outlines and also to lock the carriage in the extended condition shown by the dotted outline 67 in FIG. 1. The locking means include apertures in the moving channels and a manually operable lug secured to the static of stationary frame channels. For example, as shown in FIG. 5, an aperture 74 is provided in the flange 76 of the channel 63. This is at the or adjacent to the left hand end of the channel 63. An aperture 77 in registry therewith is provided in the stationary channel 56. A spring locking lug assembly includes a spring member 78 secured by the rivets 79 to the channel 56 and having a lug 81 thereon received in the apertures 77 and 74 and engaging the edge 82 of the aperture 74 in the carriage channel. A ramp portion 83 meets the transverse portion 81 of the lug and extends to the outside of the channel 56 where a knob 84 is attached. Thus it is seen that by pulling the knob forwardly in the direction of the arrow 86, the abutting portion 81 of the lug ceases to engage the edge 82 of the carriage channel whereupon the carriage may be pulled out to the position shown by the dotted outlines 67 in FIG. 1. An aperture 88 identical to aperture 74, is provided near the right hand end of the channel 63 of the carriage. When this aperture reaches the lug 81, the lug will snap into place and prevent further extension of the carriage. Consequently, the carriage cannot be inadvertently pulled out of the static member.

When it is desired to again return the static member from the extended condition to the retracted condition, the ramp portion 83 of the spring locking member accommodates the return of the member inasmuch as the lug is eased out by the edge of the aperture 88 as the carriage is returned to the retracted position.

It can readily be recognized, that by provision of the hooks secured to the back of the static member there is no tipping of the unit even if the car is stopped suddenly. Furthermore, by providing the high cross-member 43 at the front of the carriage, the contents will not pitch out of the carriage when the car is stopped suddenly.

The present invention provides an ideal device for carrying cargo. However, it is also well suited to carrying infants and small children. FIG. 6 shows a child's seat unit mounted to the carriage, a portion of the carriage being omitted to show details of mounting. The seating unit includes a seat 87 having a curved portion 88 at the rear which is received on the upper rear cross-member 44 of the carriage. An opening 89 is provided between the front edge of the curved portion and the top of the seat to accommodate installation of the seat on the cross-member 44 without the use of tools or attaching devices. The seat is merely slipped onto the bar 44. Similarly, frontal support for the seat 87 is provided by the hangers 91, one of which would be provided at each side of the seat 87 and both of which are hooked onto and supported by the upper front cross-member 43. The seat extends forwardly so that the front thereof at 92 extends over the upper front cross-member 19 of the frame. Therefore, the child's legs can pass between the carriage front cross-member 43 and the top of the seat 87 and are free and clear of the static frame. The child's feet can then comfortably rest on the seat cushion of the car. An integral seat back 93 is also provided being attached to the curved portion 88 of the seat.

It is seen, therefore, that the child's seat can be readily mounted to the carriage and facilitates the placing of the child in the car an removal of the child from the car by merely moving the carriage to the extended position as described previously and then returning it to the retracted position. The construction of the child's seat is such as to prevent the seat from pitching forwardly when the car is stopped or from bouncing loose in the event of the car hitting severe bumps. Naturally, a safety belt can be used, if desired.

From the foregoing description, the many desirable features and benefits derived from the present invention will be readily apparent. Other advantages and uses will undoubtedly also become apparent to those skilled in the art.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. The combination comprising:
   a motor vehicle seat assembly having a seat mounted on a seat base, and a seat back;
   a static unit having members disposed on and supported by said seat and having a front carriage support device and a rear carriage support device and having a right hand end member, the overall length of said static unit measured from the right-hand end thereof to the left-hand end thereof being less than three-quarters of the overall length of said seat measured between the right-hand end and left-hand end thereof;
   adjustable fastener means securing said end member to a portion of said seat assembly at a point at an elevation below said static unit, to prevent lateral tipping of said static unit;
   hook means extending over the top of the back of said seat assembly and secured to said static unit to prevent forward tipping of said static unit;
   and a carriage unit having an overall length substantially equal to the overall length of said static unit and mounted on said carriage support means and movable thereon in translation with respect to said static unit to a cantilever position where most of the weight of said carriage unit is disposed to the left of the left-hand end of said static unit.

2. The combination as set forth in claim 1 wherein said carriage unit includes:

a front cross member disposed at a substantial elevation above the car seat and a floor disposed substantially below said cross member to thereby prevent tipping of articles supported by the carriage upon sudden stops from forward motion of the seat assembly; and wherein said adjustable fastener means includes a strap connected to said end member and to a hook extending under said seat base and hooked thereto preventing lateral tipping of said static unit when said carriage is in said cantilever position.

3. A car seat caddy comprising:

a static unit having front and rear upper cross members;

uprights at opposite ends of said cross members; and lower end members extending between the front and rear uprights at each end of the static unit, said cross members and uprights and end members being formed of a single integral unit of tubing;

and a carriage unit having front and rear upper cross members, left and right hand end front and rear uprights, and left and right hand lower end members, each of said end members extending between and joined to a front and a rear upright, said side members and uprights and cross members being formed of a single homogeneous unit of tubing;

and a first series of horizontally spaced rollers mounted to one of said units at the front of said carriage unit, and a second series of horizontally spaced rollers mounted to one of said units at the rear of said carriage unit; and channel means mounted to the other of said units and having upper and lower support tracks in close vertically spaced relation to and alternately engageable with various ones of said rollers for mounting said carriage unit to the front and rear of said static unit and accommodating free rolling motion of said carriage unit in translation with respect to said static unit to and from positions where upper and lower surfaces of certain rollers entirely support said carriage unit in cantilever fashion on said static unit.

4. The combination as set forth in claim 3 wherein each of said lower end members of said static unit meets a front upright thereof at an obtuse angle and meets a rear upright thereof at an acute angle to dispose said uprights in a generally upstanding condition when said static unit end members are mounted on a sloping vehicle seat, and wherein lower cross members are disposed between said end members of said static unit adjacent the front of said end members and adjacent the rear of said end members to distribute the load of said static unit over a substantial portion of the width of a vehicle seat.

5. A car seat caddy comprising:

a static unit constructed and arranged for mounting to the seat of a vehicle and having front and rear cross members with carriage support means thereon;

and a carriage unit disposed between said front and rear cross members and mounted on said carriage support means for movement in translation in said static unit, said carriage unit having a front upper cross member and a rear upper cross member, the said front upper cross member being disposed at a substantially higher elevation than said rear upper cross member;

and a seating unit having a seat with an upwardly and forwardly curved rear marginal edge disposed on and received on said upper rear cross member and having a back portion extending upwardly therefrom, the forward portion of the seat extending over the front cross member of the static unit and the seat extending under the upper front cross member of the carriage unit, said seating unit further comprising hanger means having an upstanding portion secured to the seat unit and having a forwardly and downwardly curved portion disposed and supported on said upper front cross member of said carriage unit, whereby a child can sit in said seating unit with the portion of his legs below his knees extending from the frontal portion of said seating unit in a comfortable position.

References Cited in the file of this patent
UNITED STATES PATENTS

| | | |
|---|---|---|
| 2,615,493 | Hunter | Oct. 28, 1952 |
| 2,858,877 | Krause | Nov. 4, 1958 |
| 2,865,427 | Garfield | Dec. 23, 1958 |
| 2,971,655 | Duboff et al. | Feb. 14, 1961 |